(12) United States Patent
Ueno et al.

(10) Patent No.: US 10,015,856 B2
(45) Date of Patent: Jul. 3, 2018

(54) LIGHT-EMITTING APPARATUS

(71) Applicant: Panasonic Intellectual Property Management Co., Ltd., Osaka (JP)

(72) Inventors: Saori Ueno, Osaka (JP); Yuri Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/427,082

(22) Filed: Feb. 8, 2017

(65) Prior Publication Data

US 2017/0231048 A1 Aug. 10, 2017

(30) Foreign Application Priority Data

Feb. 10, 2016 (JP) ................................. 2016-024021

(51) Int. Cl.
*H05B 37/02* (2006.01)
*H05B 33/08* (2006.01)

(52) U.S. Cl.
CPC ..... *H05B 33/0845* (2013.01); *H05B 33/0872* (2013.01); *H05B 37/0281* (2013.01); *Y02B 20/42* (2013.01)

(58) Field of Classification Search
CPC ............ H05B 33/0845; H05B 33/0857; H01L 25/0753; H01L 33/486
USPC ........................................................ 315/312
See application file for complete search history.

(56) References Cited

U.S. PATENT DOCUMENTS

| 2003/0214725 | A1* | 11/2003 | Akiyama | ............. G09G 3/3413 359/640 |
| 2009/0251912 | A1* | 10/2009 | Kino | ........................ B60Q 3/82 362/492 |
| 2012/0099303 | A1* | 4/2012 | Li | ........................ H01L 25/0753 362/231 |
| 2013/0049602 | A1* | 2/2013 | Raj | .................... H05B 33/0869 315/151 |
| 2013/0329420 | A1* | 12/2013 | Matsubayashi | .... H05B 33/0857 362/231 |
| 2014/0376229 | A1* | 12/2014 | Tsumori | ................. H01L 33/50 362/293 |

(Continued)

FOREIGN PATENT DOCUMENTS

| JP | 2003-058125 A | 2/2003 |
| JP | 2006-223688 A | 8/2006 |

(Continued)

*Primary Examiner* — Tung X Le
(74) *Attorney, Agent, or Firm* — McDermott Will & Emery LLP

(57) ABSTRACT

A light treatment apparatus is an example of a light-emitting apparatus including a white light source, a blue light source, and a controller. The controller performs (i) constant light emission control for causing each of the white light source and the blue light source to emit light at constant brightness, and (ii) light reduction control which is performed after the constant light emission control so as to cause each of the white light source and the blue light source to reduce light intensity. The controller causes the blue light source to start reducing light intensity before causing the white light source to start reducing light intensity, and turns on the blue light source at the same time as or before turning on the white light source.

11 Claims, 6 Drawing Sheets

(56) References Cited

U.S. PATENT DOCUMENTS

2015/0194088 A1\* 7/2015 Jung .................... G09G 3/3413
  345/83
2015/0319816 A1\* 11/2015 Chen .................... H05B 39/044
  315/210

FOREIGN PATENT DOCUMENTS

| JP | 2008-210535 A | 9/2008 |
| JP | 2013-058394 A | 3/2013 |
| JP | 2015-118759 A | 6/2015 |

\* cited by examiner

LIGHT-EMITTING APPARATUS

CROSS REFERENCE TO RELATED APPLICATION

This application claims the benefit of priority of Japanese Patent Application Number 2016-024021 filed on Feb. 10, 2016, the entire content of which is hereby incorporated by reference.

TECHNICAL FIELD

The present disclosure relates to a light-emitting apparatus for use in light treatment etc.

DESCRIPTION OF THE RELATED ART

Conventionally, light-emitting apparatuses using light-emitting elements, such as LEDs, are used in various applications. For example, Patent Literature 1 (Japanese Unexamined Patent Application Publication. No. 2006-223688) discloses a dental light irradiation device. In addition, it has been known that light treatment using a light-emitting apparatus capable of irradiating the subject with blue light is effective for improvement of premenstrual syndrome (PMS), melancholia, sleep rhythm, etc.

SUMMARY

When a light-emitting apparatus is used for light treatment, reducing the sense of incongruity which is felt by a user is an issue.

The present disclosure provides a light-emitting apparatus capable of reducing the sense of incongruity which is felt by the user.

A light-emitting apparatus according to an aspect of the present disclosure includes: a white light source; a blue light source; and a controller which performs (i) constant light emission control for causing the white light source to emit light at first constant brightness and causing the blue light source to emit light at second constant brightness, and, after the constant light emission control, (ii) light reduction control for causing each of the white light source and the blue light source to reduce light intensity, wherein, in the light reduction control, the controller (i) causes the blue light source to start reducing light intensity before the white light source starts reducing light intensity, and (ii) turns off the blue light source at a same time as or before turning off the white light source.

The light-emitting apparatus according to the present disclosure is capable of reducing the sense of incongruity which is felt by the user.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, an embodiment of the present disclosure is described with reference to the drawings. Each of exemplary embodiments described below shows a generic or specific example of the present disclosure. The numerical values, shapes, materials, constituent elements, the arrangement positions and connection of the constituent elements, steps, the order of the steps etc. described in the following embodiments are mere examples, and do not limit the scope of the present disclosure. In addition, among the constituent elements in the following embodiments, constituent elements not recited in any one of the independent claims that define the most generic concept are described as arbitrary constituent elements.

It is to be noted that each of the drawings is a schematic diagram, and this is not always illustrated precisely. In addition, in each of the diagrams, the same numerical references are assigned to substantially the same constituent elements, and overlapping descriptions may be omitted or simplified.

Embodiment 1

[Configuration]

Figure 1:
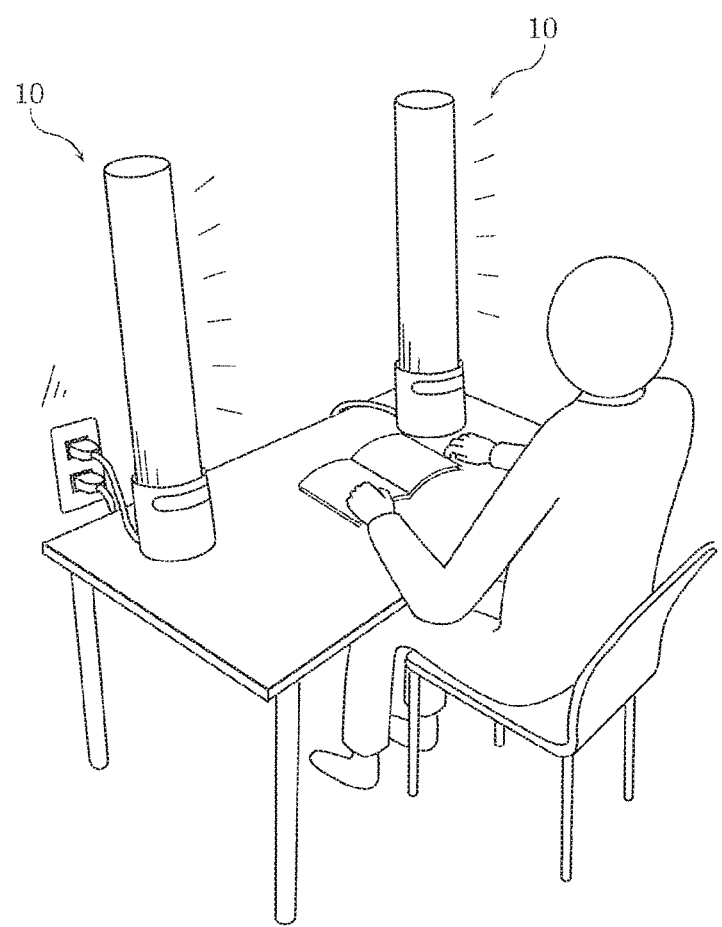
FIG. 1 is a diagram illustrating an outline of a light treatment; apparatus according to Embodiment 1.
Figure 2:
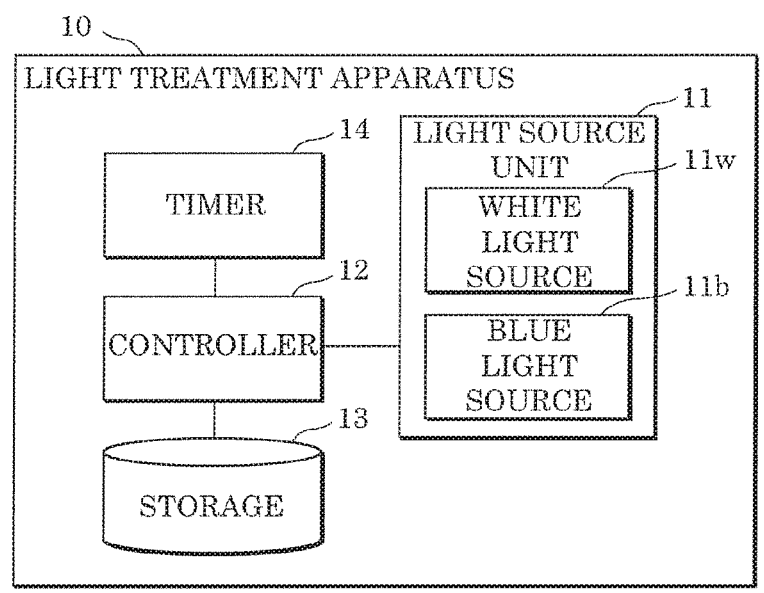
FIG. 2 is a block diagram illustrating a functional configuration of the light treatment apparatus according to Embodiment 1.

First, a configuration of a light treatment apparatus according to Embodiment 1 is described. FIG. 1 is an outside drawing of a light treatment apparatus according to Embodiment 1. FIG. 2 is a block diagram illustrating a functional configuration of the light treatment apparatus according to Embodiment 1.

As illustrated in FIG. 1, light treatment apparatus 10 according to Embodiment 1 is a light-emitting apparatus having an approximately cylindrical shape erected on a desk or the like. In other words, light treatment apparatus 10 is an example of a light-emitting apparatus. Light treatment apparatus 10 emits bluish white light in which blue light and white light are mixed. A subject (hereinafter referred to as a user) is irradiated with such light when the user wakes up or during the daytime. In this way, the user's melatonin secretion is reduced when the user wakes up or during the daytime, which improves PMS, melancholia, and sleep rhythm.

Although it is only necessary that the user be irradiated with a blue monochromatic light for reducing melatonin secretion in order to improve PMS etc., light treatment apparatus 10 irradiates the user with light in which blue light and white light are mixed so that the user can perform operation such reading during the treatment. In addition, although two light treatment apparatuses 10 are arranged on the desk in the example of FIG. 1, it is only necessary that at least one light treatment apparatus 10 be mounted.

As illustrated in FIG. 2, light treatment; apparatus 10 includes light source 11, controller 12, storage 13, and timer 14. The respective constituent elements are described in detail.

Light source 11 is a constituent element which functions as a light source of light treatment apparatus 10. Light source 11 includes, specifically white light source 11$w$ and blue light source 11$b$.

White light source 11$w$ is a light source which emits white light, and is specifically a filament lamp, a fluorescent lamp, or the like. In addition, white light source 11$w$ may be a light source using an LED. In this case, white light source 11$w$ may be a light-emitting module of a chip on board (COB) type, or a light-emitting module of a surface mount device (SMD) type. In addition, white light source 11$w$ may be a light-emitting module of a remote phosphor type.

White light to be emitted by white light source 11$w$ may be a white color on a black body locus, or a white color out of the black body locus. In addition, a correlated color temperature of white light to be emitted by white light source 11$w$ is not particularly limited.

Blue light source 11$b$ is a light source which emits blue light. Blue light source 11$b$ is a light-emitting module using, specifically, a blue LED, or a light-emitting module using a blue LED. Specific implementation of blue light source 11$b$ is not particularly limited.

Figure 3:
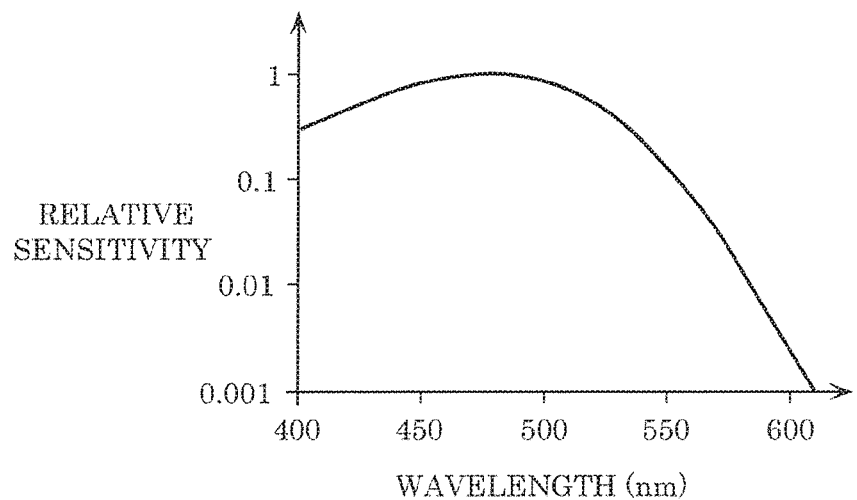
FIG. 3 is a diagram illustrating an action spectrum of melatonin.

Blue light source 11$b$ emits, for example blue monochromatic light having a light-emission peak wavelength ranging from 450 nm to 495 nm inclusive. In order to reduce melatonin secretion more effectively, the peak wavelength of the light emitted by blue light source 11$b$ may range from 460 nm to 480 nm inclusive. FIG. 3 is a diagram illustrating an action spectrum of melatonin. FIG. 3 illustrates that the effect of reducing melatonin secretion increases with increase in the vertical-axis value. As illustrated in FIG. 3, the melatonin secretion reduction effect is excellent within the rage from 460 nm to 480 nm inclusive.

Controller 12 controls light source 11. Controller 12 is capable of controlling white light source 11$w$ and blue light source 11$b$ separately. In other words, controller 12 is capable of selectively either irradiating the user with white light by causing only white light source 11$w$ to emit white light or irradiating the user with blue light by causing only blue light source 11$b$ to emit blue light.

In addition, controller 12 is capable of dimming white light and dimming blue light. Controller 12 is also capable of irradiating the user with light (bluish white light) in which white light and blue light are mixed at an arbitrary ratio. Controller 12 is capable of creating an emission light color on a straight line that connects the coordinates of the white light emitted by white light source 11$w$ and the blue light emitted by blue light source 11$b$ on a color space such as the CIE color system. Controller 12 may change emission light color based on mired function.

For example, controller 12 is configured with: an AC-DC converter circuit which converts alternating-current electricity that light treatment apparatus 10 obtains from an external, power source to direct-current electricity; a DC-DC converter circuit: a PWM control circuit (dimming circuit) for controlling light output by light source 11, etc. Controller 12 may be configured with a processor, a microcomputer, etc.

Storage 13 is, for example, a storage device in which a control program to be executed by controller 12 is stored when controller 12 includes a processor, a microcomputer, or the like. Storage 13 is, for example, configured with a semiconductor memory.

Timer 14 counts time in order to control time for light source 11 to irradiate the user with light. Timer 14 may be specifically a timer circuit, a real-time clock IC, or the like, or other implementation is also possible. Time information indicating time counted by timer 14 is output to controller 12. Controller 12 controls the time for light source 11 to irradiate the user with light according to the time counted by timer 14.

Operation Example 1

Figure 4:
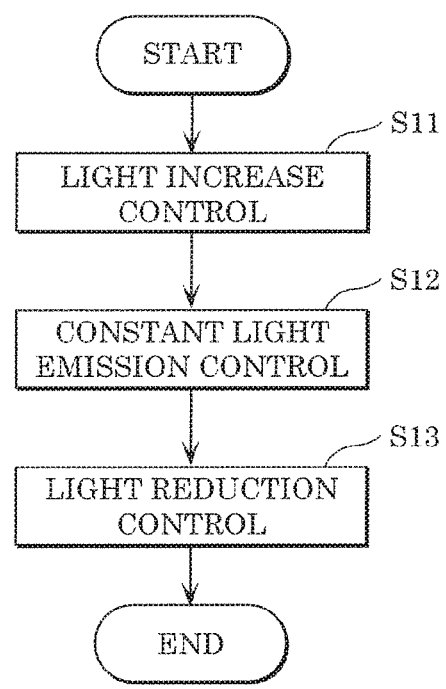
FIG. 4 is a flowchart of operations performed by the light treatment apparatus according to Embodiment 1.
Figure 5:
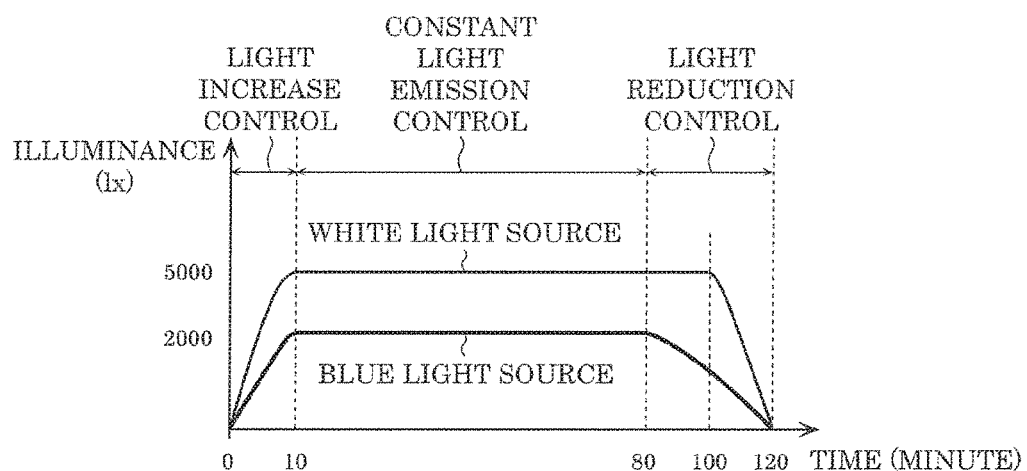
FIG. 5 is a diagram illustrating temporal variation in illuminance of the light treatment apparatus in operational example 1.

Next, operational example 1 of light treatment apparatus 10 is described. FIG. 4 is a flowchart of operations performed by light treatment apparatus 10. FIG. 5 is a diagram illustrating temporal change in the illuminance of light treatment apparatus 10 in operational example 1. It is to be noted that the illuminance shown in FIG. 5 is illuminance at a predetermined irradiation, position (a user's position illustrated in FIG. 1) apart, by 40 cm from light treatment apparatus 10. This holds true in the descriptions hereinafter. In FIG. 5, the scales of the vertical axis and the horizontal axis are schematically shown, and are not always precise.

Light treatment apparatus 10 is turned on when each of white light source 11$w$ and blue light source 11$b$ is in an turn-off state (the illuminance is zero). In response to this, controller 12 starts light increase control (control in a light increase mode) (S11). The light increase control is performed immediately before constant light emission control. The light increase control is performed to give the user's eyes a chance to adjust to the illuminance in the constant light emission control.

Controller 12 gradually increases taking time each of white light source 11$w$ and blue light source 11$b$ in the light increase control, in other words, in the light increase control, controller 12 increases by degrees each of the illuminance of the white light emitted by white light source 11$w$ and the illuminance of the blue light emitted by blue light source 11$b$. Each of the illuminance of white light and the illuminance of blue light increases, for example, linearly or almost linearly, as non-limiting increase implementation.

As illustrated in FIG. 5, in the light increase control in operational example 1, controller 12 turns on white light source 11$w$ at the same time as turning on blue light source 11$b$, and causes white light source 11$w$ to reach constant brightness at the same time as causing blue light source 11$b$ to reach constant brightness. The time required from the start time when each of white light source 11$w$ and blue light source 11$b$ is turned on to the time when the constant brightness is reached is, for example, approximately 10 minutes. In other words, the light increase control is finished within approximately 10 minutes.

Next, controller 12 starts constant light emission control (control in the constant light-emission mode) (S12). The constant light emission control is main control in light treatment. Controller 12 causes each of white light source 11$w$ and blue light source 11$b$ to emit light at constant brightness (illuminance) in the constant light emission control. As illustrated in FIG. 5, in the constant light emission control, the illuminance of white light is approximately 5000 lux, and the illuminance of blue light is approximately 2000 lux.

Here, in the constant light emission control, the first constant brightness is greater than the second constant brightness. In this way, the visibility in the case where the user performs an operation while receiving light treatment is increased. In operational example 1, the period in which the constant light emission control is performed is 70 minutes that starts from 10 minutes after the start of the turn-on and lasts until 80 minutes elapses after the start.

Next, controller 12 starts constant light reduction control (control in the constant light-emission mode) (S13). The light reduction control is started when each of white light source 11w and blue light source 11b emits light at constant brightness, in other words, when each of them is under the constant light emission control. Stated differently, the light reduction control is performed immediately after the constant light emission control. The light reduction control is performed in order to reduce the sense of incongruity which will have been felt by the user until a state in which the constant light emission control is performed is created.

Controller 12 reduces, gradually taking time, light emitted by white light source 11w and light emitted by blue light source 11b in the light reduction control. In other words, in the light reduction control, controller 12 reduces by degrees each of the illuminance of white light and the illuminance of blue light. Each of the illuminance of white light and the illuminance of blue light is reduced, for example, linearly or almost linearly, as non-limiting reduction implementation. As a result of the light reduction control, each of white light source 11w and blue light source 11b is turned off. The light reduction control is finished within approximately 40 minutes.

Here, in the light reduction control, controller 12 causes blue light source 11b to start reducing light before causing white light source 11w to start reducing light. In FIG. 5, blue light source 11b starts reducing light 80 minutes after the start of the turn-on, and white light source 11w starts reducing light 100 minutes after the start of the turn-on. In other words, in the light reduction control, controller 12 causes blue light source 11b to start reducing light 20 minutes before causing white light source 11w to start reducing light.

In this way, the ratio of white light with respect to blue light increases at the beginning of the light reduction control, and thus natural light reduction is achieved. Slightly bluish white light looks almost white to a person who has been present in an environment in which the bluish white light is lit over a certain period of time. This phenomenon is caused by a human eyes' function for correcting the color of emitted light to white. This is called chromatic adaptation.

By reducing light while increasing the ratio of white light as described above, natural light reduction is achieved utilizing chromatic adaptation. Thus, it is possible to reduce the sense of incongruity which is felt by the user. In contrast, if the ratio of white light with respect to blue light is reduced at the beginning of the light reduction control, since blue light has a comparatively large chrominance with respect to white light, the user recognizes the color of emitted light as becoming bluish, and feels the sense of incongruity.

In addition, in FIG. 5, controller 12 turns off blue light, source 11b at the same time as turning off white light source 11w in the light reduction control. Specifically, controller 12 turns off blue light source 11b and white light source 11w at the same time 120 minutes after the start of the turn-on. However, controller 12 may turn off blue light source 11b before turning off white light source 11w. In other words, in the light reduction control, controller 12 turns off blue light source at the same time as or before turning off white light source 11w in the light reduction control.

When white light source 11w is turned off before blue light source 11b is turned off, the user is irradiated with only blue light in the final phase of the light reduction control. In this case, the user's eyes perceive an afterimage representing yellow complementary to blue after the end of the light reduction control. This phenomenon is called as accidental color.

On the other hand, when blue light source 11b is turned off at the same time when or before white light source 11w is turned off, the user is irradiated with white light or slightly bluish white light at the final phase of the light reduction control. Accordingly, it is possible to reduce such accidental color, and thereby reducing the sense of incongruity which is felt by the user.

In addition, in the light reduction control, light emitted by light source 11 is reduced while reducing the ratio of blue light with respect to white light with time. Accidental color is reduced also in this way.

Operation Example 2

Figure 6:
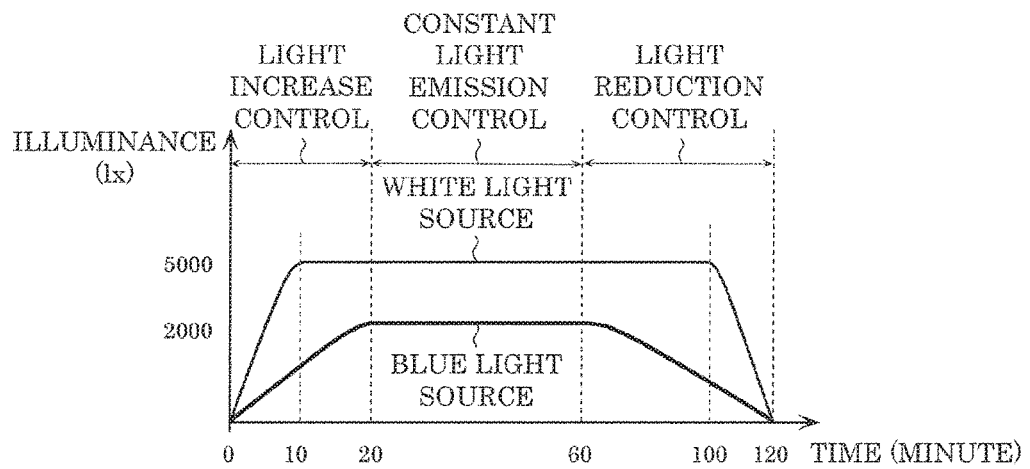
FIG. 6 is a diagram illustrating temporal variation in illuminance of the light treatment apparatus in operational example 2.

Next, operational example 2 of light treatment apparatus 10 is described. FIG. 6 is a diagram illustrating temporal change in the illuminance of light treatment apparatus 10 in operational example 2. In FIG. 6, the scales of the vertical axis and the horizontal axis are schematically shown, and are not always precise. In the descriptions below, points different from those provided in operational example 1 are mainly described, without providing overlapping descriptions.

In light increase control in operational example 2, controller 12 causes white light source 11w to reach constant brightness before causing blue light source 11b to reach constant brightness. In FIG. 6, the illuminance of the white light emitted by white light source 11w roaches 200 lux 10 minutes after the start of turn-on, and the illuminance of the blue light emitted by blue light source 11b reaches 5000 lux 20 minutes after the start of the turn-on. In other words, in the light increase control, controller 12 causes white light source 11w to reach the constant brightness before causing blue light source 11b to reach the constant brightness.

In this way, under the light increase control, light is prevented from exhibiting blue deeper than in light under the constant light emission control. Accordingly, natural light increase is achieved, and thereby reducing the sense of incongruity which is felt by the user.

In addition, in FIG. 6, controller 12 turns on blue light source 11b at the same time as turning on white light source 11w in the light increase control. However, controller 12 may turn on blue light source 11b before turning on white light source 11w. In other words, controller 12 may turn on white light source 11w at the same time as or before turning on blue light source 11b in the light increase control.

If blue light source 11b is turned on before white light source 11w is turned on, the user is irradiated with only blue light in the initial phase of the light increase control. In this case, since blue light has a comparatively large chrominance with respect to white light, the user recognizes the color of emitted light as becoming bluish, and feels the sense of incongruity. In the light increase control, it is possible to reduce the sense of incongruity by turning on white light source 11w at the same time as or before turning on blue light source 11b.

It is to be noted that, in operational example 2, the period in which the constant light emission control is performed lasts for 40 minutes which is shorten from the time in operational example 1. In addition, in operational example 2, light reduction control is started earlier than in operational example 1. In FIG. 6, blue light source 11b starts reducing light 60 minutes after the start of the turn-on, and white light source 11w starts reducing light 100 minutes after the start of the turn-on. In other words, in the light reduction control, controller 12 causes blue light source 11b to start reducing light 40 minutes before causing white light source 11w to start reducing light.

In this way, by means of causing blue light source 11b to start reducing light at a further earlier timing, blue light source reduces the light taking longer time, which further reduces accidental color.

Operation Example 3

Figure 7:
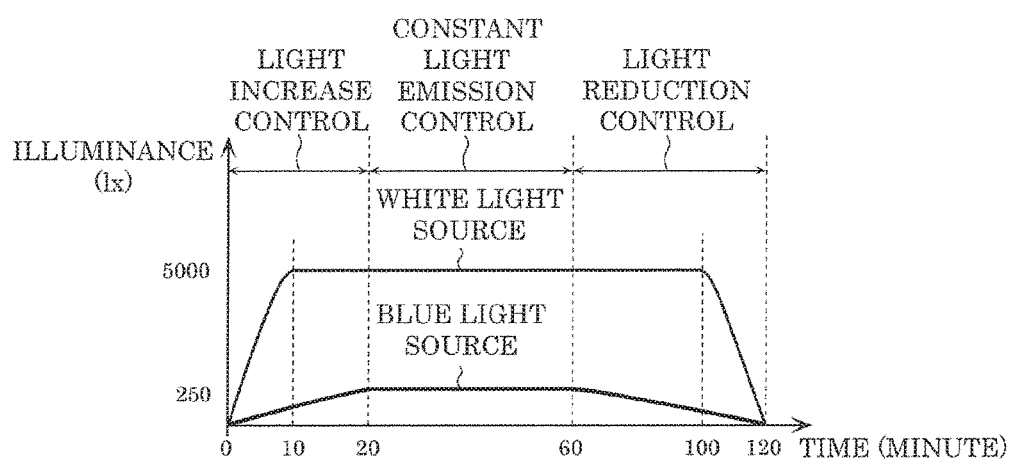
FIG. 7 is a diagram illustrating temporal variation in illuminance of the light treatment apparatus in operational example 3.

Next, operational example 3 of light treatment apparatus 10 is described. FIG. 7 is a diagram illustrating temporal change in the illuminance of light treatment apparatus 10 in operational example 3. In FIG. 7, the scales of the vertical axis and the horizontal axis are schematically shown, and are not always precise. In the descriptions below, points different from those provided in operational example 2 are mainly described, without providing overlapping descriptions.

In operational example 3, the illuminance of blue light in the constant light emission control is reduced more significantly than in operational example 2. More specifically, the illuminance of blue light is approximately 250 lux while the illuminance of white light is approximately 5000 lux. In other words, in the constant light emission control, controller 12 increases illuminance at a predetermined position for irradiating the user with the light emitted by white light source 11w to be at least 10 times (specifically, 20 times) higher than illuminance at a predetermined position for irradiating the user with the light emitted by blue light source 11b.

In this way, the visibility in the case where the user performs an operation is further increased when the constant light emission control is performed.

Operation Example 4

Figure 8:
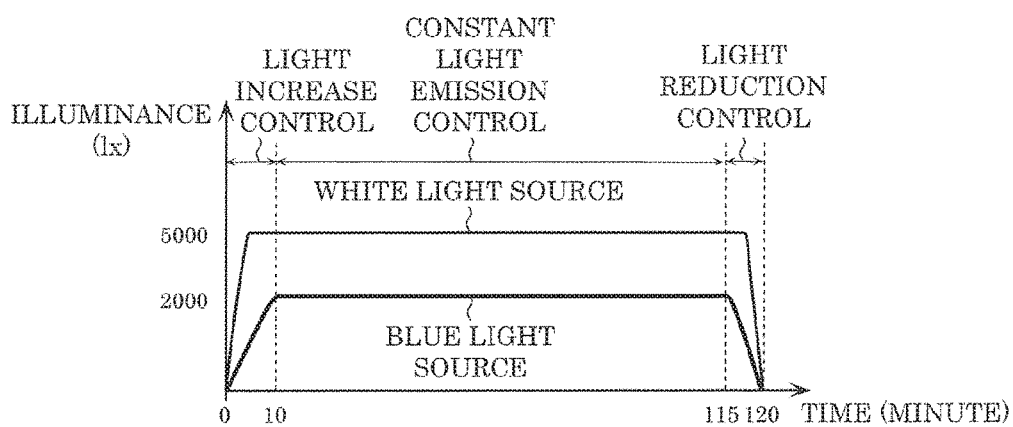
FIG. 8 is a diagram illustrating temporal variation in illuminance of the light treatment apparatus in operational example 4.

Next, operational example 4 of light treatment apparatus 10 is described. FIG. 8 is a diagram illustrating temporal change in the illuminance of light treatment apparatus 10 in operational example 4. In FIG. 8, the scales of the vertical axis and the horizontal axis are schematically shown, and are not always precise. In the descriptions below, points different from those provided in operational examples 1 to 3 are mainly described, without providing overlapping descriptions.

In operational example 4, time in which constant light emission control is performed is extended compared to the time in each of operational examples 1 to 3. In FIG. 8, the period in which the constant light emission control is performed lasts for 105 minutes that starts from 10 minutes after the start of the turn-on and lasts until 115 minutes elapses after the start of the turn-on.

It is to be noted that the length of the entire period in which light treatment is performed is 120 minutes as in the cases of operational examples 1 to 3. The period for performing light reduction control is shortened by the extended time in the period for performing the constant light emission control. The period for performing the light reduction control lasts for 5 minutes.

By means of the period for performing the light reduction control being shortened and the period for performing the constant light emission control being extended, it is possible to fully obtain the light treatment, effect (the effect of reducing melatonin secretion). In addition, when the period for performing the constant light emission control is extended, it is also possible to shorten the length of the entire period for light treatment.

The period for performing the light reduction control is not limited to 5 minutes, and may be shorter than 10 minutes. The length of the period for performing the light reduction control may be one-tenth of the length of the entire period for the light treatment. In this way, light treatment apparatus 10 can shorten the length of the entire period for the light treatment.

It is to be noted that, in light increase control also in operational example 4, controller 12 turns on white light source 11w at the same time as turning on blue light source 11b, and causes white light source 11w to reach constant brightness before causing blue light source 11b to reach constant brightness. In FIG. 8, the illuminance of the white light emitted by white light source 11w reaches 2000 lux 5 minutes after the start of the turn-on, and the illuminance of the blue light emitted by blue light source 11b reaches 5000 lux 10 minutes after the start of the turn-on.

Likewise, in the light reduction control also m operational example 4, controller 12 causes blue light source 11b to start reducing light before causing white light source 11w to start reducing light, and turns off blue light source 11b at the same time as turning off white light source 11w. In FIG. 8, blue light source 11b starts reducing light 115 minutes after the start of the turn-on, and white light source 11w starts reducing light 117.5 minutes after the start of the turn-on.

Effects Etc. of Embodiment 1

As described above, light treatment apparatus 10 includes white light source 11w, blue light source 11b, and controller 12. Light treatment apparatus 10 is an example of a light-emitting apparatus. Controller 12 performs (i) constant light emission control for causing white light source 11w to emit light at first constant brightness and causing blue light source 11b to emit light at second constant brightness, and (ii) light reduction control which performed after the constant light emission control so as to cause each of white light source 11w and blue light source 11b to reduce light intensity in the light reduction control, controller 12 causes blue light source 11b to start reducing light intensity before causing white light source 11w to start reducing light intensity, and turns off blue light source 11b at the same time as or before turning off white light source 11w.

In this way, under the light reduction control, light is prevented from exhibiting deeper blue. Accordingly, natural light reduction is achieved, reducing the sense of incongruity which is felt by the user due to accidental color.

In addition, controller 12 may further perform, before the constant light emission control, light increase control for causing white light source 11w and blue light source 11b to increase light intensity to reach the first constant brightness and the second constant brightness, respectively. In the light increase control, controller 12 may turn on white light source 11w at the same time as or before turning on blue light source 11b, and cause white light source 11w to reach the first constant brightness before causing blue light source 11b to reach the second constant brightness.

In this way, under the light, increase control, light is prevented from exhibiting deeper blue. Accordingly, natural light increase is achieved, and thereby reducing the sense of incongruity which is felt by the user.

In addition, in the constant light emission control, the first constant brightness is greater than the second constant brightness.

In this way, the visibility in the case where the user performs an operation while receiving light treatment is increased.

In addition, in the light reduction control, time from start to end of the light reduction control is shorter than 10 minutes.

In this way, controller 12 can lengthen the period for performing the constant light emission control. By means of the constant light emission control being performed for a long period, it is possible to fully obtain the light treatment effect (the effect of reducing melatonin secretion). In addition, when the period for performing the constant light emission control is extended, it is also possible to shorten the length of the entire period for light treatment.

In addition, blue light source 11b may emit light having a peak wavelength ranging from 460 nm to 480 nm inclusive.

In this way, since it is possible to fully obtain the effect of reducing melatonin secretion, and thus to improve the user's PMS etc. effectively.

Embodiment 2

[Configuration]

Figure 9:
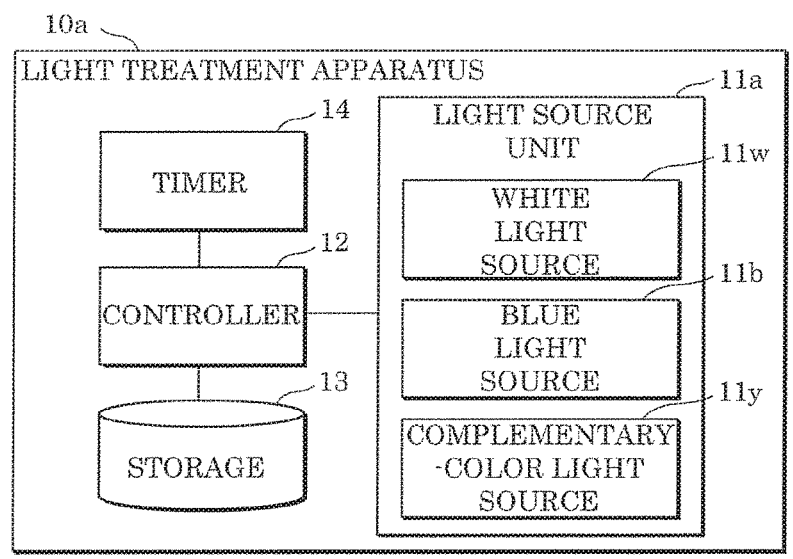
FIG. 9 is a block diagram illustrating a functional configuration of a light treatment apparatus according to Embodiment 2.

Next, a configuration of a light treatment apparatus according to Embodiment 2 is described. FIG. 9 is a block diagram illustrating a functional configuration of the light treatment apparatus according to Embodiment 2. In Embodiment 2, points different from those provided in Embodiment 1 are mainly described, without providing overlapping descriptions.

As illustrated in FIG. 9, light source 11a of light treatment apparatus 10a according to Embodiment 2 is different from light treatment apparatus 10, in the point of further including complementary-color light source 11y.

Complementary-color light source 11y emits light having a color complementary to the color of the light emitted by blue light source 11b. Complementary-color light source 11y is a light source which emits light exhibiting yellow complementary to blue. Complementary-color light source 11y is a light-emitting module using, specifically, a yellow LED, or a light-emitting module using a yellow LED. Specific implementation of complementary-color light source 11y is not particularly limited. Complementary-color light source 11y emits, for example, a yellow monochromatic light having a light-emission peak wavelength ranging from 570 nm to 590 nm inclusive.

Controller 12 controls light source 11a. Controller 12 is capable of controlling white light source 11w, blue light source 11b, and complementary-color light source 11y separately. For example, controller 12 is capable of selectively irradiating the user with yellow light by causing only complementary-color light source 11y to emit the complementary-color light. In addition, controller 12 is also capable of irradiating the user with light in which white light, blue light, and yellow light are mixed at an arbitrary ratio.

Operation Example

Figure 10:
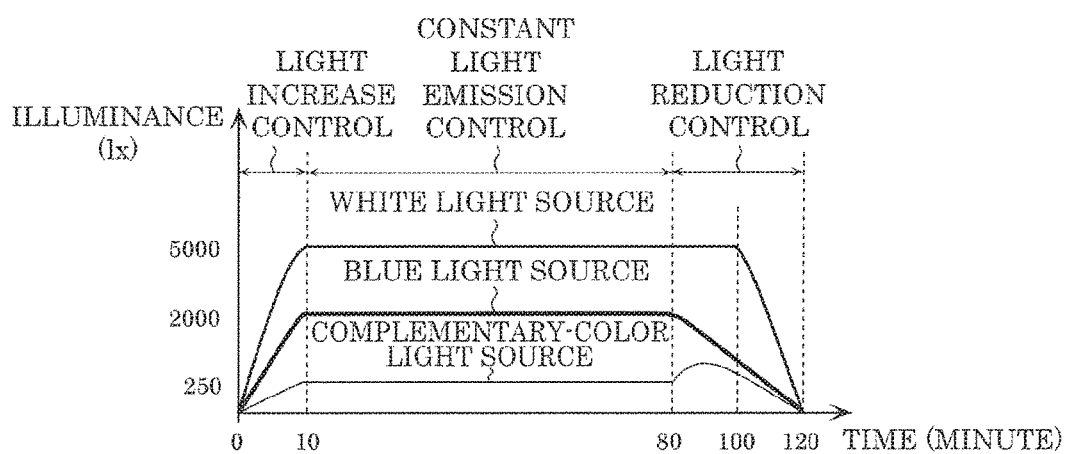
FIG. 10 is a diagram illustrating an outline of a light treatment apparatus according to Embodiment 2.

Next, operational example of light treatment apparatus 10a is described. FIG. 10 is a diagram illustrating temporal change in the illuminance of light treatment apparatus 10a. In FIG. 6, the scales of the vertical axis and the horizontal axis are schematically shown, and are not always precise. In the descriptions below, points different from those provided in operational example 1 according to Embodiment 1 are mainly described, without providing overlapping descriptions.

The operational example illustrated in FIG. 10 is different from operational example 1 in the point of turning on complementary-color light source 11y throughout the entire light treatment period.

In the light increase control, controller 12 causes complementary-color light source 11y to increase light by degrees taking time. In other words, in the light increase control, controller 12 increases by degrees the illuminance of the yellow light emitted by complementary-color light source 11y. The illuminance of the yellow light increases, for example, linearly or almost linearly, as non-limiting increase implementation. Complementary-color light source 11y reaches constant brightness at the same time when each of white light source 11w and blue light source 11b reaches constant brightness. The time required for complementary-color light source 11y to reach the constant brightness is, for example, approximately 10 minutes.

In the constant light emission control that follows the light increase control, controller 12 causes complementary-color light source 11y to emit light at constant brightness (illuminance). In the constant light emission control, the illuminance of the yellow light is constant at approximately 250 lux. The period for performing the constant light emission control lasts for approximately 70 minutes.

In the earlier phase of the light reduction control that follows the constant light emission control, controller 12 firstly increases the illuminance of the yellow light. In other words, in the light reduction control, controller 12 increase the ratio of the illuminance of the light emitted by the complementary-color light source fly with respect to the illuminance of the light emitted by blue light source 11b at the predetermined irradiation position, so that the ratio is higher than in the constant light emission control.

In this way, the blue light and the yellow light are compensated with each other, which softens the blue color of the light emitted by light source 11a. Accordingly, it is possible to reduce the sense of incongruity which is felt by the user.

In the middle and later phase of the light reduction control, controller 12 causes complementary-color light source 11y to reduce light by degrees taking time. In other words, controller 12 turns off complementary-color light source 11y after reducing the illuminance of the yellow light by degrees. In FIG. 10, complementary-color light source 11y turns off white light source 11w and blue light source 11b at the same time. The period for performing the light reduction control lasts, for example, for approximately 40 minutes.

In other words, in the light reduction control, controller 12 increases the ratio of the illuminance of the light emitted by the complementary-color light source 11y with respect to the illuminance of the light emitted by blue light source 11b at the predetermined irradiation position, compared to the ratio in the constant light emission control. For example, controller 12 may turn on complementary-color light source 11y only in the light reduction control.

Effects Etc. of Embodiment 2

As described above, light treatment apparatus 10a may further include complementary-color light source 11y which emits light exhibiting a color complementary to the color of the light emitted by blue light source 11b. In the light reduction control, controller 12 may increase, at the predetermined irradiation position, the ratio of the illuminance of the light emitted by the complementary-color light source 11y with respect to the illuminance of the light emitted by blue light source 11b, so that the ratio is higher than in the constant light emission control.

In this way, under the light reduction control, light is prevented from exhibiting deeper blue. Accordingly, natural light reduction is achieved, reducing the sense of incongruity which is felt by the user due to accidental color.

Variations of the Embodiments

Although the above embodiments have been described, the present disclosure is not limited to the above embodiments.

For example, the time durations for irradiating the user with light described in the above embodiments are mere examples. The entire light treatment period has been described as being 120 minutes as a non-limiting example, but may be approximately 20 to 30 minutes.

Although the light-emitting apparatus in each of the above embodiments according to the present disclosure has been described as a light treatment apparatus as an exemplary implementation, the light-emitting apparatus according to the present disclosure may be implemented as other luminaires such as a ceiling light, a downlight, and a desk lamp. In other words, the present disclosure does not always need to be implemented as an apparatus for light treatment only.

In addition, the constituent elements of the light source described in each of the above embodiments are mere examples. The following may be used as the light source: a fluorescent tube, a metal halide lamp, a sodium lamp, a halogen lamp, a Xenon lamp, a neon tube, or the like. Alternatively, the following may be used as the light source: an inorganic electro-luminescence, an organic electro-luminescence, a chemi-luminescence (chemical light emission), a semiconductor laser, or the like. In addition, the light source may emit light having a desired color using a spectral filter or the like. The light source may be anything that can emit light having the desired color.

The general and specific aspects of the present disclosure may be implemented using a system, a method, an integrated circuit, a computer program, or a computer-readable recording medium such as a CD-ROM, or any combination of systems, methods, integrated circuits, computer programs, or computer-readable recording media. For example, the present disclosure may be implemented as a control method performed by the light-emitting apparatus, a program for causing a computer to execute the control method performed by the light-emitting apparatus, or a light treatment apparatus according to any of the above-described embodiments. In addition, in the case where only the controller according to any of the above-described embodiments is implemented as an independent control device, the present disclosure may be implemented as the control device.

It is to be noted that a part or all of the constituent elements such as the controller in each of the above-described embodiments may be configured in the form of exclusive hardware, or may be realized by executing a software program suitable for the constituent element. Each of the constituent elements may be implemented by means of a program executor such as a CPU or a processor, or reading and executing the software program recorded in a recording medium such as a hard disk or a semiconductor memory.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light-emitting apparatus, comprising:
a white light source;
a blue light source; and
a controller which performs (i) constant light emission control for causing the white light source to emit light at first constant brightness and causing the blue light source to emit light at second constant brightness, and, after the constant light emission control, (ii) light reduction control for causing each of the white light source and the blue light source to gradually reduce light intensity,
wherein, in the light reduction control, the controller causes the blue light source to start reducing light intensity before the white light source starts reducing light intensity, and causes the blue light source to gradually reduce light intensity so as to reach a turn-off state at a same time as when or before causing the white light source to reach a turn-off state.

2. The light-emitting apparatus according to claim 1, wherein, in the constant light emission control, the first constant brightness is greater than the second constant brightness.

3. The light-emitting apparatus according to claim 2, wherein the first constant brightness is ten times or more the second constant brightness.

4. The light-emitting apparatus according to claim 1, wherein, in the light reduction control, time from start to end of the light reduction control is shorter than 10 minutes.

5. The light-emitting apparatus according to claim 1, wherein the blue light source emits light having a peak wavelength ranging from 460 nm to 480 nm inclusive.

6. A light-emitting apparatus, comprising:
a white light source;
a blue light source; and
a controller which performs (i) constant light emission control for causing the white light source to emit light at first constant brightness and causing the blue light source to emit light at second constant brightness, and, after the constant light emission control, (ii) light reduction control for causing each of the white light source and the blue light source to reduce light intensity, wherein:
in the light reduction control, the controller causes the blue light source to start reducing light intensity before the white light source starts reducing light intensity, and turns off the blue light source at a same time as or before turning off the white light source, and
the controller further performs, before the constant light emission control, light increase control for causing the white light source and the blue light source to increase light intensity to reach the first constant brightness and the second constant brightness, respectively, and in the light increase control, the controller turns on the white light source at a same time as or before turning on the blue light source, and causes the white light source to reach the first constant brightness before causing the blue light source to reach the second constant brightness.

7. A light-emitting apparatus, comprising:
a white light source;
a blue light source;
a controller which performs (i) constant light emission control for causing the white light source to emit light at first constant brightness and causing the blue light source to emit light at second constant brightness, and, after the constant light emission control, (ii) light reduction control for causing each of the white light source and the blue light source to reduce light intensity; and
a complementary-color light source which emits light having a color complementary to a color of light emitted by the blue light source, wherein:
in the light reduction control, the controller causes the blue light source to start reducing light intensity before the white light source starts reducing light intensity, and turns off the blue light source at a same time as or before turning off the white light source, and
in the light reduction control, the controller increases, at a predetermined irradiation position, a ratio of illuminance of the light emitted by the complementary-color light source with respect to illuminance of the light emitted by the blue light source, so that the ratio is higher than in the constant light emission control.

8. A light-emitting apparatus, comprising:
a white light source;
a blue light source; and
a controller which controls first light intensity of the white light source and second light intensity of the blue light source, the first and second light intensity being light intensity at a predetermined irradiation position,
wherein, when the controller gradually changes the first and second light intensity, the controller changes the second light intensity more slowly than the first light intensity, and
the controller performs at least one of the following operations:
(i) when the controller decreases the first and second light intensity and turns off the white light source and the blue light source, the controller turns off the blue light source at a same time as or before turning off the white light source, and
(ii) when the controller turns on the white light source and the blue light source and increases the first and second light intensity, the controller turns on the blue light source at a same time as or after turning on the white light source.

9. The light-emitting apparatus according to claim 8, wherein, when the controller maintains light intensity of the white light source and the blue light source, the first light intensity is greater than the second light intensity.

10. The light-emitting apparatus according to claim 8, wherein the controller controls the white light source and the blue light source such that the first light intensity is always greater than the second light intensity.

11. The light-emitting apparatus according to claim 8, further comprising a complementary-color light source which emits light having a color complementary to a color of light emitted by the blue light source, wherein:
the controller controls third light intensity of the complementary-color light source, and
when the controller reduces the second and third light intensity, the controller controls the blue light source and the complementary-color light source, such that a ratio of the third light intensity with respect to the second light intensity is higher than a ratio of the third light intensity with respect to the second light intensity when the maintains light intensity of the second and third light intensity.

* * * * *